(12) United States Patent
Liu et al.

(10) Patent No.: US 12,437,497 B2
(45) Date of Patent: Oct. 7, 2025

(54) METHOD, DEVICE, AND COMPUTER PROGRAM PRODUCT FOR IMAGE PROCESSING

(71) Applicant: Dell Products L.P., Round Rock, TX (US)

(72) Inventors: Zhisong Liu, Shenzhen (CN); Zijia Wang, Weifang (CN); Zhen Jia, Shanghai (CN)

(73) Assignee: Dell Products L.P., Round Rock, TX (US)

( * ) Notice: Subject to any disclaimer, the term of this patent is extended or adjusted under 35 U.S.C. 154(b) by 357 days.

(21) Appl. No.: 18/128,071

(22) Filed: Mar. 29, 2023

(65) Prior Publication Data

US 2024/0290063 A1    Aug. 29, 2024

(30) Foreign Application Priority Data

Feb. 28, 2023    (CN) .......................... 202310182301.X

(51) Int. Cl.
*G06V 10/44* (2022.01)
*G06T 5/20* (2006.01)
(Continued)

(52) U.S. Cl.
CPC ................ *G06V 10/44* (2022.01); *G06T 5/20* (2013.01); *G06T 7/11* (2017.01); *G06T 7/70* (2017.01);
(Continued)

(58) Field of Classification Search
CPC .. G06V 10/44; G06T 5/20; G06T 7/11; G06T 7/70; G06T 9/00; G06T 17/00;
(Continued)

(56) References Cited

U.S. PATENT DOCUMENTS 11,321,916 B1 *  5/2022  Zhang ..................... G06T 19/00
11,983,826 B2 *  5/2024  Berger ...................... G06T 7/70
(Continued)

OTHER PUBLICATIONS

S. Kubo, Y. Iwasawa, M. Suzuki and Y. Matsuo, "UVTON: UV Mapping to Consider the 3D Structure of a Human in Image-Based Virtual Try-On Network," 2019 IEEE/CVF International Conference on Computer Vision Workshop (ICCVW), Seoul, Korea (South), 2019, pp. 3105-3108, (Year: 2019).*

(Continued)

*Primary Examiner* — Andrae S Allison
(74) *Attorney, Agent, or Firm* — Ryan, Mason & Lewis, LLP

(57) ABSTRACT

Embodiments of the present disclosure relate to a method, a device, and a computer program product for image processing. The method includes: obtaining a target object segmentation map for a target image and a reference dress-up segmentation map for a reference image, wherein the target image presents a target object, and the reference image presents reference dress-up; extracting a target image feature of the target image and a reference image feature of the reference image by means of image encoding of the target image and the reference image; and transferring the reference dress-up in the reference image to the target object based on the target object segmentation map, the reference dress-up segmentation map, the target image feature, and the reference image feature.

20 Claims, 6 Drawing Sheets

(51) Int. Cl.
    *G06T 7/11*     (2017.01)
    *G06T 7/70*     (2017.01)
    *G06T 9/00*     (2006.01)
    *G06T 17/00*     (2006.01)

(52) U.S. Cl.
    CPC ............... *G06T 9/00* (2013.01); *G06T 17/00* (2013.01); *G06T 2207/10024* (2013.01); *G06T 2207/20081* (2013.01)

(58) Field of Classification Search
    CPC . G06T 2207/10024; G06T 2207/20081; G06T 2210/16; G06T 19/00; G06T 7/10; G06T 19/20; G06T 2207/10012; G06T 2219/2008
    See application file for complete search history.

(56) References Cited

U.S. PATENT DOCUMENTS

| | | | | |
|---|---|---|---|---|
| 12,100,156 | B2* | 9/2024 | Dudovitch | G06F 18/2155 |
| 2022/0207596 | A1* | 6/2022 | Fan | G06T 19/00 |
| 2022/0258049 | A1* | 8/2022 | Kanani | G06Q 30/0621 |
| 2023/0046431 | A1* | 2/2023 | Garg | G06T 15/04 |
| 2023/0123820 | A1* | 4/2023 | Wang | G06N 3/088 |
| | | | | 345/474 |
| 2023/0267663 | A1* | 8/2023 | Chopra | G06T 7/11 |
| | | | | 345/629 |
| 2024/0346762 | A1* | 10/2024 | Dudovitch | G06T 19/20 |
| 2025/0037403 | A1* | 1/2025 | Yang | G06V 40/10 |

OTHER PUBLICATIONS

Majithia, Sahib, et al. "Robust 3d garment digitization from monocular 2d images for 3d virtual try-on systems." Proceedings of the IEEE/CVF Winter Conference on Applications of Computer Vision. 2022. (Year: 2022).*
Xie, You, et al. "Temporaluv: Capturing loose clothing with temporally coherent uv coordinates." Proceedings of the IEEE/CVF Conference on Computer Vision and Pattern Recognition. 2022. (Year: 2022).*
Kubo et al, UVTON: UV Mapping to Consider the 3D Structure of a Human in Image-Based Virtual Try-On Network, 2019 IEEE/CVF International Conference on Computer Vision Workshop (ICCVW) (Year: 2019).*
A. Toshev et al., "DeepPose: Human Pose Estimation via Deep Neural Networks," arXiv:1312.4659v3, Aug. 20, 2014, 9 pages.
J. Wang et al., "Deep High-Resolution Representation Learning for Visual Recognition," arXiv:1908.07919v2, Mar. 13, 2020, 23 pages.
Z. Cao et al., "OpenPose: Realtime Multi-Person 2D Pose Estimation using Part Affinity Fields," arXiv:1812.08008v2, May 30, 2019, 14 pages.
G. Pavlakos et al., "Coarse-to-Fine Volumetric Prediction for Single-Image 3D Human Pose," arXiv:1611.07828v2, Jul. 26, 2017, 10 pages.
D. Pavllo et al., "3D Human Pose Estimation in Video With Temporal Convolutions and Semi-Supervised Training," arXiv:1811.11742v2, Mar. 29, 2019, 13 pages.
Y. Cheng et al., "Occlusion-Aware Networks for 3D Human Pose Estimation in Video," IEEE/CVF International Conference on Computer Vision, Oct. 2019, 10 pages.
M. Loper et al., "SMPL: A Skinned Multi-Person Linear Model," ACM Transactions on Graphics, vol. 34, No. 6, Nov. 2015, pp. 248:1-248:16.
G. Pavlakos et al., "Expressive Body Capture: 3D Hands, Face, and Body from a Single Image," arXiv:1904.05866v1, Apr. 11, 2019, 22 pages.
N. Mahmood et al., "AMASS: Archive of Motion Capture as Surface Shapes," arXiv:1904.03278v1, Apr. 5, 2019, 12 pages.
A. Kanazawa et al., "End-to-end Recovery of Human Shape and Pose," arXiv:1712.06584v2, Jun. 23, 2018, 10 pages.
M. Kocabas et al., "VIBE: Video Inference for Human Body Pose and Shape Estimation," arXiv:1912.05656v3, Apr. 29, 2020, 12 pages.
S. Saito et al., "PIFu: Pixel-Aligned Implicit Function for High-Resolution Clothed Human Digitization," arXiv:1905.05172v3, Dec. 3, 2019, 15 pages.
S. Saito et al., "PIFuHD: Multi-Level Pixel-Aligned Implicit Function for High-Resolution 3D Human Digitization," IEEE/CVF Conference on Computer Vision and Pattern Recognition, Jun. 2020, 10 pages.
Y. Xiu et al., "ICON: Implicit Clothed Humans Obtained from Normals," arXiv:2112.09127v2, Mar. 28, 2022, 22 pages.
X. Han et al., "VITON: An Image-based Virtual Try-on Network," arXiv:1711.08447v4, Jun. 12, 2018, 19 pages.
Z. Liu et al., "DeepFashion: Powering Robust Clothes Recognition and Retrieval with Rich Annotations," Proceedings of the IEEE Conference on Computer Vision and Pattern Recognition, Jun. 2016, pp. 1096-1104.
K. He et al., "Deep Residual Learning for Image Recognition," IEEE Conference on Computer Vision and Pattern Recognition (CVPR), Jun. 2016, pp. 770-778.
X. Huang et al., "Arbitrary Style Transfer in Real-Time with Adaptive Instance Normalization," arXiv:1703.06868v2, Jul. 30, 2017, 11 pages.
U.S. Appl. No. 18/110,165 filed in the name of Zhisong Liu et al. on Feb. 15, 2023, and entitled "Method, Electronic Device, and Computer Program Product for Generating Three-Dimensional Model."
U.S. Appl. No. 18/126,619 filed in the name of Zhisong Liu et al. on Mar. 27, 2023, and entitled "Method, Electronic Device, and Computer Program Product for Virtual Reality Modeling."

* cited by examiner

METHOD, DEVICE, AND COMPUTER PROGRAM PRODUCT FOR IMAGE PROCESSING

RELATED APPLICATION

The present application claims priority to Chinese Patent Application No. 202310182301.X, filed Feb. 28, 2023, and entitled "Method, Device, and Computer Program Product for Image Processing," which is incorporated by reference herein in its entirety.

FIELD

Embodiments of the present disclosure relate generally to the field of computers, and more specifically to a method, a device, and a computer program product for image processing.

BACKGROUND

The metaverse is a new trend, which will lead mankind into a new digital era where people can have real and extreme experiences. The metaverse is a virtual world constructed by digital technology, which is mapped from or transcends the real world and can interact with the real world. For the metaverse, an important issue is whether metaverse applications can be used anywhere without worrying about the latency of computation and data access, which poses challenges in data storage and edge computing.

In order to construct metaverse worlds providing realistic experiences, it is important to have powerful and efficient three-dimensional (3D) human body modeling techniques. Meanwhile, deep learning techniques are increasingly applied in a variety of different fields, including 3D human body modeling and rendering.

SUMMARY

Embodiments of the present disclosure provide a solution for image processing.

In a first aspect of the present disclosure, a method for image processing is provided, the method including: obtaining a target object segmentation map for a target image and a reference dress-up segmentation map for a reference image, wherein the target image presents a target object, and the reference image presents reference dress-up. The method further includes: extracting a target image feature of the target image and a reference image feature of the reference image by means of image encoding of the target image and the reference image. The method further includes: transferring the reference dress-up in the reference image to the target object based on the target object segmentation map, the reference dress-up segmentation map, the target image feature, and the reference image feature.

In another aspect of the present disclosure, a device for image processing is provided, the device including: a processor, and a memory coupled to the processor and having instructions stored thereon that, when executed by the processor, cause the device to perform the following actions: obtaining a target object segmentation map for a target image and a reference dress-up segmentation map for a reference image, wherein the target image presents a target object, and the reference image presents reference dress-up; extracting a target image feature of the target image and a reference image feature of the reference image by means of image encoding of the target image and the reference image; and transferring the reference dress-up in the reference image to the target object based on the target object segmentation map, the reference dress-up segmentation map, the target image feature, and the reference image feature.

In a further aspect of the present disclosure, a computer program product is provided. The computer program product is tangibly stored in a non-transitory computer-readable storage medium and includes computer-executable instructions, wherein these computer-executable instructions, when executed by a computer, cause the computer to execute the method or process according to embodiments of the present disclosure.

It should be noted that this Summary is provided to introduce in a simplified form a set of concepts that will be further described below in specific embodiments. The Summary is neither intended to identify key features or essential features of content of the present disclosure, nor intended to limit the scope of the content of the present disclosure.

BRIEF DESCRIPTION OF THE DRAWINGS

The foregoing and other objectives, features, and advantages of the present disclosure will become more clearly understood from the description herein of illustrative embodiments of the present disclosure, provided in more detail below with reference to the accompanying drawings, in which.

Throughout all the drawings, the same or similar reference numerals generally represent the same or similar elements.

DETAILED DESCRIPTION

Figure 1:
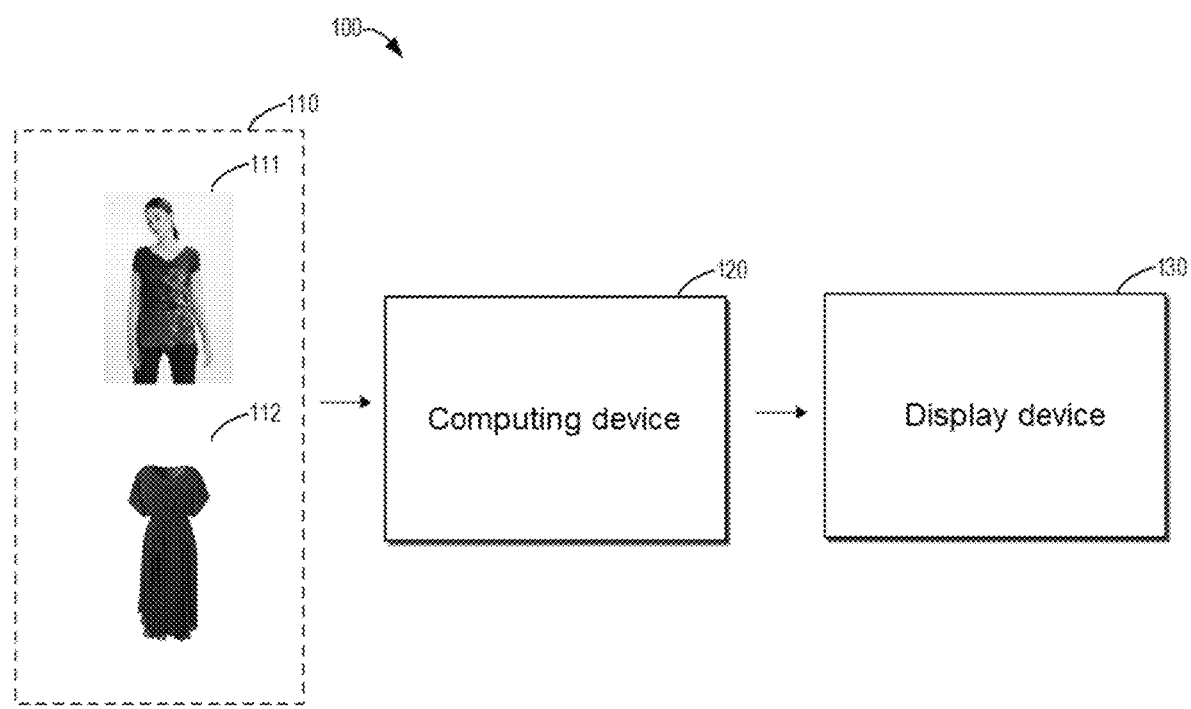
FIG. 1 illustrates a schematic diagram of an example environment in which a device and/or a method according to embodiments of the present disclosure can be implemented.

Illustrative embodiments of the present disclosure will be described in more detail below with reference to the accompanying drawings. Although certain embodiments of the present disclosure are illustrated in the accompanying drawings, it should be understood that the present disclosure can be implemented in various forms and should not be construed as being limited to the embodiments set forth herein. Rather, these embodiments are provided for a more thorough and complete understanding of the present disclosure. It should be understood that the accompanying drawings and embodiments of the present disclosure are for illustrative purposes only, and are not intended to limit the protection scope of the present disclosure.

In the description of embodiments of the present disclosure, the term "including" and its variations should be understood as open-ended inclusion, i.e., "including but not limited to." The term "based on" should be understood as "based at least in part on." The term "an embodiment" or "the embodiment" should be understood as "at least one embodiment." The terms "first," "second," and the like may refer to different or identical objects, unless otherwise specifically indicated.

As mentioned above, the metaverse, as a new generation of Internet trend, has attracted more and more public attention. The metaverse is a virtual world constructed by digital technology, which is mapped from or transcends the real world and can interact with the real world. The use of virtual reality applications for the metaverse not only can make products more targeted to meet customized needs of users, but also can improve the interaction between products and users to make the interaction process convenient and interesting.

In order to construct metaverse worlds having realistic experiences, it is important to have powerful and efficient three-dimensional (3D) human body modeling techniques. For example, 3D human body virtual try-on based on 3D human body modeling technology is a virtual reality application for the metaverse, which can provide customized 3D human body fashion design.

Meanwhile, deep learning techniques are increasingly applied in a variety of different fields, including 3D human body modeling and rendering. The research on 3D human body modeling originated from the classical two-dimensional (2D) human body key point detection. However, different from the 2D human body key point detection, 3D human body key point detection is more useful for 3D understanding. For human body behaviors and motions, there is often partial occlusion, and thus depth information is needed to separate them. One of the solutions for learning depth is through the time series of motions of a human body.

The above-noted 3D human body virtual try-on is a new trend in this research field. The idea is to transfer a desired dress-up to a target group of people with the aid of 3D technology so as to have a virtual experience of different fashion styles. The advantages of 3D virtual human body virtual try-on are that different virtual images can be customized, costs can be saved for fashion companies (such as the operating costs of offline physical stores), and so on.

However, existing methods may have many undesired disadvantages. For example, the existing methods are either limited to transferring only desired small accessories (e.g., glasses) or makeup (e.g., lip makeup) to the target group of people in the case of 2D to 3D mapping, or limited to transferring 2D image-based fashion designs in the case of 2D only. For another example, in some other existing methods, even if the transfer of clothing in the case of 2D to 3D mapping is tenuously achieved, such methods must model the clothing to be transferred in advance, which makes the transfer process consume huge computing resources and considerable time costs, and makes the number of transferable clothing items very limited, and the transferred clothing often fails to fit the pose of a target object, making the clothing oddly shaped and unnaturally fitting after the transfer.

At least to address at least some of the above and other potential problems, embodiments of the present disclosure provide a solution for image processing. The solution comprises: obtaining a target object segmentation map for a target image and a reference dress-up segmentation map for a reference image, wherein the target image presents a target object, and the reference image presents reference dress-up; extracting a target image feature of the target image and a reference image feature of the reference image by means of image encoding of the target image and the reference image; and transferring the reference dress-up in the reference image to the target object based on the target object segmentation map, the reference dress-up segmentation map, the target image feature, and the reference image feature. In this way, a full-body 3D virtual try-on is realized, which makes the 3D virtual try-on process more in line with the real try-on demands of users and makes the 3D virtual try-on experience richer. The 3D virtual try-on according to embodiments of the present disclosure does not need to model the reference dress-up to be transferred in advance, thus avoiding the waste of computing resources and time costs and avoiding the limitation to the number of transferable clothing items. In addition, the 3D virtual try-on according to embodiments of the present disclosure can also avoid an odd shape or unnatural fit of the dress-up after the transfer, making the try-on experience more realistic.

Basic principles and some example implementations of the present disclosure are illustrated below with reference to FIG. 1 to FIG. 6. It should be understood that these example embodiments are given only to enable those skilled in the art to better understand and thus implement embodiments of the present disclosure, and are not intended to limit the scope of the present disclosure in any way.

FIG. 1 illustrates a schematic diagram of an example environment 100 in which a method and/or a device according to embodiments of the present disclosure can be implemented. In this example environment 100, a two-dimensional target image 111 and a two-dimensional reference image 112 as an input 110 can be input to an image processing model according to embodiments of the present disclosure at a computing device 120. A corresponding calculation (e.g., the image processing process described below) is performed at the computing device 120 by the image processing model to achieve global style transfer according to embodiments of the present disclosure. At a display device 130, the 3D target object model for which the style transfer has been completed is displayed.

For the input 110, the target image 111 and the reference image 112 may each be a single two-dimensional red, green, and blue (RGB) image. According to embodiments of the present disclosure, the target image 111 includes a target object, and the target object may include a person, an animal, or other objects. Further, the reference image 112 includes reference dress-up, and the reference dress-up may include clothes, accessories, makeup, or other dress-up. Although single two-dimensional RGB images are taken herein as an example of the target image 111 and the reference image 112 for illustration, respectively, it should be understood that the present disclosure does not limit the number, dimensionality, and type of the target image 111 and the reference image 112, and that the target image 111 and the reference image 112 may also include images of more or less numbers and dimensions, and other types.

The computing device 120 may be any device with computing capabilities. According to embodiments of the present disclosure, upon receiving the target image 111 and the reference image 112 as described above, the computing device 120 performs corresponding calculations via the image processing model thereon to enable the global style transfer according to embodiments of the present disclosure. Examples of the computing device 120 may include a smart phone, a tablet computer, a personal computer, a laptop computer, a server computer, a multiprocessor system, a wearable electronic device, a multimedia player, a personal digital assistant (PDA), a smart home device, a consumer electronic product, and the like. Examples of the computing device 120 may also include a distributed computing environment that includes any of the above systems or devices, and the like.

The 3D target object model for which the style transfer has been completed will be transmitted to the display device 130 for display. The display device 130 may be any device with a display function. According to embodiments of the present disclosure, the display device may be a display dedicated to display purposes, such as a television or projector, or may be an electronic device with a display unit, such as a smart phone or smart watch. It should be noted that the arrangement of the computing device 120 and the display device 130 as shown in FIG. 1 is an example, and the present disclosure is not limited to such arrangement. In another example, the display device 130 may be within the computing device 120, and the computing device 120 receives the input 110, performs the corresponding calculations, and transmits the 3D target object model for which the style transfer has been completed to the display device 130 located therein for display. In this way, a separate display device is no longer required. It should also be noted that each of the above examples is not intended to be limiting, but is shown as an example only for the purpose of aid of understanding, and that embodiments of the present disclosure are not limited to the examples shown above.

The schematic diagram of the example environment 100 in which a method and/or a device according to embodiments of the present disclosure can be implemented is described above in conjunction with FIG. 1. A flow chart of a method 200 for image processing according to embodiments of the present disclosure is described below in conjunction with FIG. 2. As described above for the computing device 120, the method 200 for image processing according to embodiments of the present disclosure may be performed at an edge device with computing capabilities (e.g., a smart phone) or at a cloud server, and the present disclosure is not limited in this regard.

Figure 2:
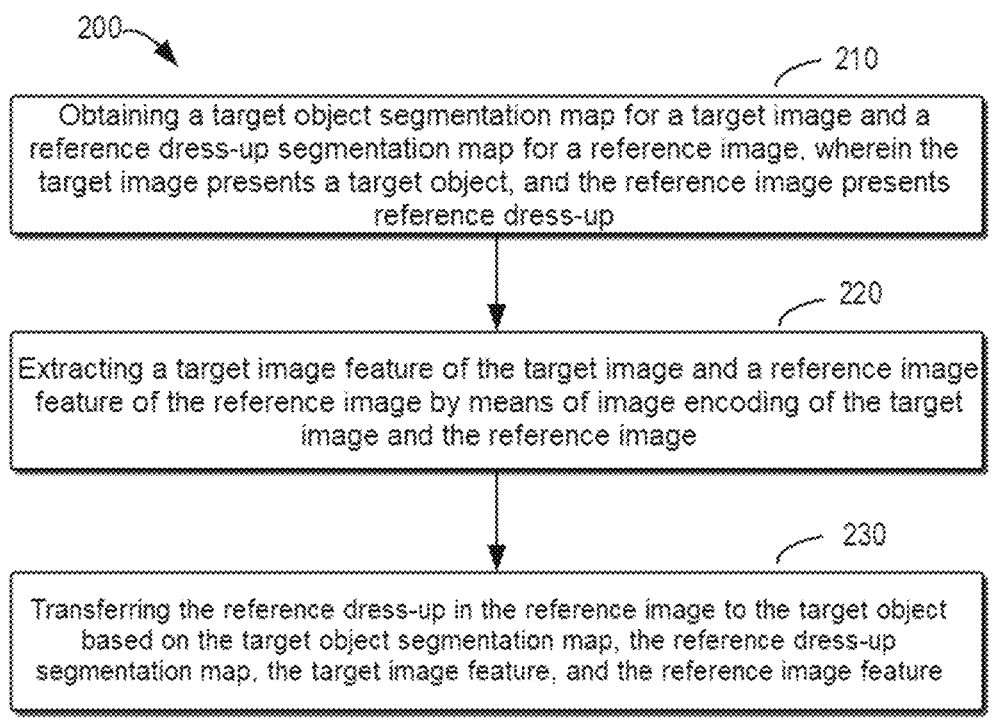
FIG. 2 illustrates a flow chart of a method for image processing according to embodiments of the present disclosure.

FIG. 2 illustrates a flow chart of the method 200 for image processing according to embodiments of the present disclosure. As consumer models are updated and improved, consumers tend to perform try-on virtually and then buy online for reasons such as convenience, instead of going to physical stores to choose as in the past. Compared with the conventional in-store try-on, virtual try-on provides consumers with more options and can save consumers time and labor costs. In addition, this is also beneficial for merchants. Merchants can reduce the operating costs of offline physical stores and focus more on the design and production of goods. 3D human body virtual try-on is a new trend in the field of virtual try-on, which transfers a desired dress-up to a target group of people with the aid of 3D technology so as to have a virtual experience of different fashion styles.

However, as described above, existing methods are unable to provide a good try-on experience. For example, either only desired small accessories or makeup can be transferred to a target object, or clothes to be transferred need to be modeled before transfer, making the number of transferable clothing items extremely limited and consuming huge computing resources, and the transferred clothes also often fail to accurately fit the pose of the target object, making the clothes oddly shaped and unnaturally fitting after the transfer. To address at least some of the above problems and other potential problems, the method 200 for image processing according to embodiments of the present disclosure is provided.

At block 210, a target object segmentation map for a target image and a reference dress-up segmentation map for a reference image are obtained, wherein the target image presents a target object, and the reference image presents reference dress-up. According to embodiments of the present disclosure, the target object may, for example, be a consumer with a demand for virtual try-on as described above, and the reference dress-up may, for example, be desired dress-up that the target object needs to try on virtually. The decoupling/segmentation process described herein is performed by a segmentation encoder according to embodiments of the present disclosure, and such a segmentation encoder will be described in detail below.

At block 220, a target image feature of the target image and a reference image feature of the reference image are extracted by means of image encoding of the target image and the reference image. According to embodiments of the present disclosure, the image encoding of the target image and the reference image may be performed by an image encoder, and the present disclosure does not limit the image encoder as long as it can implement the extraction of the target image feature of the target image and the reference image feature of the reference image as described above.

At block 230, the reference dress-up in the reference image is transferred to the target object based on the target object segmentation map, the reference dress-up segmentation map, the target image feature, and the reference image feature. Based on the target object segmentation map, the reference dress-up segmentation map, the target image feature, and the reference image feature obtained at block 210 and block 220, respectively, a transfer process is performed so that the reference dress-up in the reference image is transferred to the target object. The transfer process described herein is performed by a transferrer according to embodiments of the present disclosure, and the operations of such a transferrer will be described in detail below. Further, 3D virtual try-on by the target object is achieved by means of 3D presentation of the target object including the reference dress-up in the reference image.

By the method 200 for image processing according to embodiments of the present disclosure, the target object can try on the reference dress-up in the reference image in a 3D virtual manner without modeling the reference dress-up to be transferred in advance, thus avoiding the waste of huge computing resources and considerable time costs, and avoiding the dilemma that the number of transferable dress-up items is limited. In addition, such 3D virtual try-on is a full-body 3D virtual try-on, rather than the transfer of only small accessories or makeup in conventional methods, making the 3D virtual try-on process more in line with the real try-on demands of users and making the 3D virtual try-on experience richer. Other advantageous technical effects of the present disclosure will be described in further detail below.

As described above, the target image may present the target object, and the reference image may present the reference dress-up. According to another embodiment of the present disclosure, the target image may also present the original dress-up of the target object, and the reference image may also present a reference object that includes (e.g., wears) the reference dress-up desired by the target object.

With respect to the situation above, in the context of 3D virtual try-on, according to embodiments of the present disclosure, the target object and the original dress-up may be decoupled and segmented, the reference object and the reference dress-up may be decoupled and segmented, and the transfer process according to embodiments of the present disclosure may be performed to transfer the reference dress-up in the reference image to the target object.

More specifically, according to embodiments of the present disclosure, a target edge image and a reference edge image can be obtained by filtering the target image and the reference image; the target object segmentation map, an original dress-up segmentation map, and target object key point information for the target image can be obtained based on the target image and the target edge image; and a reference object segmentation map, the reference dress-up segmentation map, and reference object key point information for the reference image can be obtained based on the reference image and the reference edge image. The target object key point information indicates a pose of the target object in the target image, and the reference object key point information indicates a pose of the reference object in the reference image. Using the target object key point information and the reference object key point information can facilitate the decoupling/segmentation process according to embodiments of the present disclosure, for example, making the acquired segmentation maps more accurate, and can facilitate the shaping process according to embodiments of the present disclosure, for example, making the transferred reference dress-up accurately fit the target object. The shaping process according to embodiments of the present disclosure will be described in detail below.

According to embodiments of the present disclosure, in addition to the target object segmentation map, the reference dress-up segmentation map, the target image feature, and the reference image feature as described above, the reference dress-up in the reference image can also be transferred to the target object based on the original dress-up segmentation map, the target object key point information, the reference object segmentation map, and the reference object key point information.

To achieve the global transfer of the fashion style, the reference dress-up in the reference image is transferred to the target object by the decoupling/segmentation process and the transfer process according to embodiments of the present disclosure as described above. According to embodiments of the present disclosure, transferring the reference dress-up in the reference image to the target object may include: transferring all the reference dress-up in the reference image to the target object; and shaping the transferred reference dress-up, so that the transferred reference dress-up accurately fits the target object. According to embodiments of the present disclosure, transferring the reference dress-up in the reference image to the target object may further include transferring environmental conditions presented in the reference image to the target object. The environmental conditions described herein may include the hue and lighting conditions of the reference image.

Since the global transfer of fashion style according to embodiments of the present disclosure can transfer all the reference dress-up in the reference image to the target object and can also transfer the environmental conditions presented in the reference image to the target object, this is a full-body 3D virtual try-on, rather than the transfer of only small accessories or makeup in conventional methods, thus making the 3D virtual try-on process more in line with the real try-on demands of users, and making the 3D virtual try-on experience richer. In addition, through the shaping process according to embodiments of the present disclosure, dress-up such as clothes can accurately fit the pose of the target object after the transfer, thereby avoiding odd shape or unnatural fit of clothes after the transfer and making the 3D virtual try-on experience more realistic.

Further, the shaping process according to embodiments of the present disclosure includes: determining a distribution of key points of the target object in the target image and a distribution of key points of the reference object in the reference image based on the target object key point information and the reference object key point information; and deforming the reference dress-up based on a mapping from the key points of the reference object to the key points of the target object.

In addition, according to embodiments of the present disclosure, the target object can be edited. For example, the hair color and skin color of the target object, etc., can be edited. At least some of the transferred reference dress-up can also be edited, such as changing the color of the clothes or modifying some small accessories, and for another example, removing some undesired reference dress-up from the transferred reference dress-up, and so on. In addition, at least some of the transferred environmental conditions can be edited, such as adjusting the hue or lighting conditions.

Figure 3:
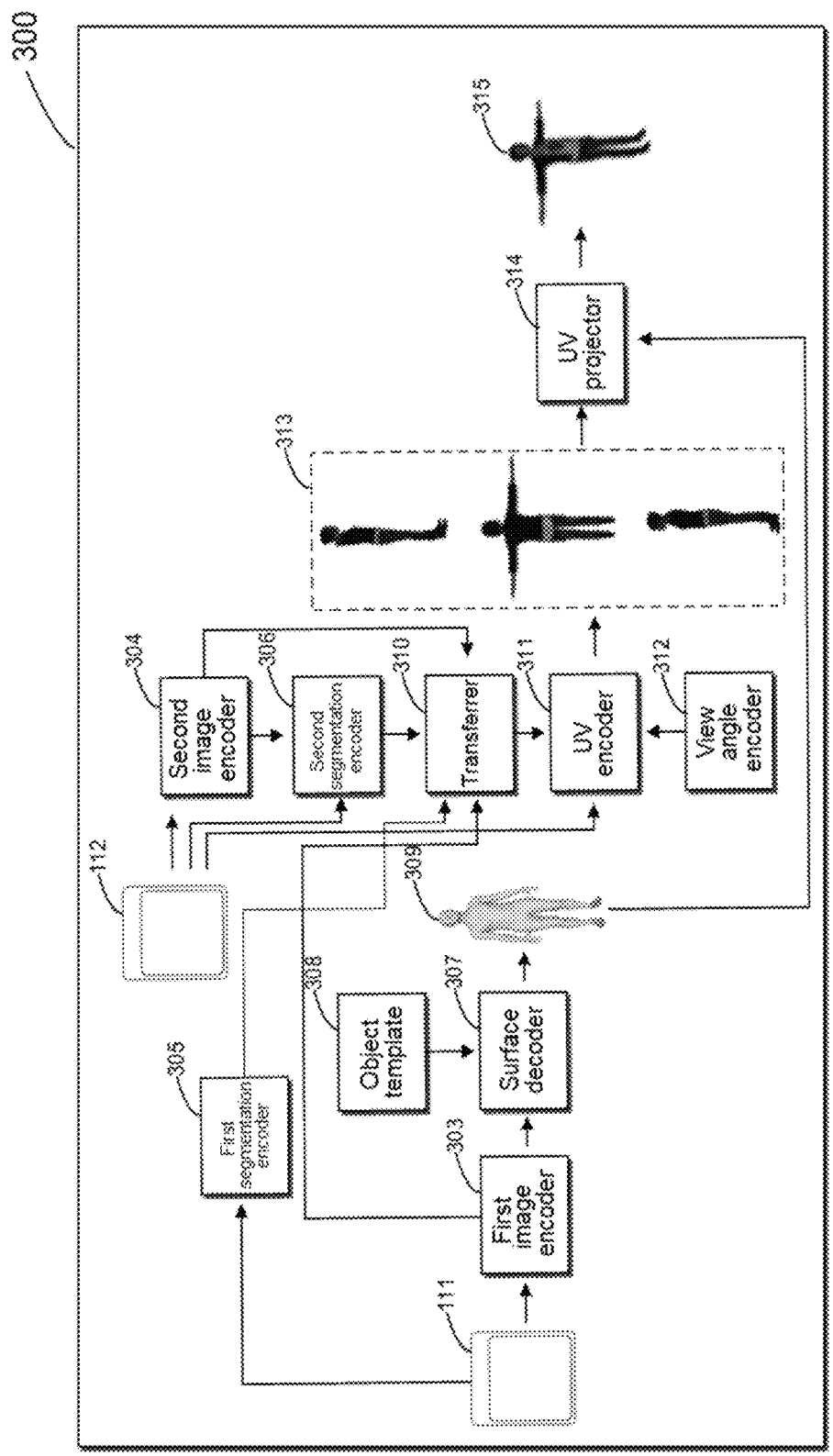
FIG. 3 illustrates a schematic diagram of an architecture of an image processing model according to embodiments of the present disclosure.

FIG. 3 illustrates a schematic diagram of an architecture of an image processing model 300 according to embodiments of the present disclosure. As shown in the figure, the image processing model 300 according to embodiments of the present disclosure includes a first image encoder 303, a second image encoder 304, a first segmentation encoder 305, a second segmentation encoder 306, a surface decoder 307, an object template 308, a 3D target object model 309, a transferrer 310, a UV encoder 311, a view angle encoder 312, a view 313 of the target object including the reference dress-up in the reference image 112 in multiple view angles, a UV projector 314, and a 3D-presented target object 315 including the reference dress-up in the reference image 112, wherein U and V are used to identify the coordinate axes of the texture map.

According to embodiments of the present disclosure, the first image encoder 303 may perform image encoding on the target image 111 to extract 2D image features of the target image 111. The surface decoder 307 may build a 3D target object model 309 for the target object by modeling the target object presented in the target image 111 based on the 2D image features of the target image 111 and the object template 308. The object template 308 may be a skinned multi-person linear model (SMPL) template (SMPL model), and the object template 308 may include parameters of the shape and pose of the 3D target object model 309 for the target object. The 3D target object model 309 for the target object may be built, for example, using a 10-dimensional shape vector β and a 23-dimensional pose vector α, based on which the 3D target object model 309 may be built as H=SMPL(β, α).

According to embodiments of the present disclosure, the second image encoder 304 may perform image encoding on the reference image 112 to extract 2D image features of the reference image 112. The first segmentation encoder 305 may perform a decoupling/segmentation process according to embodiments of the present disclosure on the target image 111 to acquire segmentation maps for the target image 111 (such as the target object segmentation map and the original dress-up segmentation map), and the second segmentation encoder 306 may perform a decoupling/segmentation process according to embodiments of the present disclosure on the reference image 112 to obtain segmentation maps for the reference image 112 (such as the reference object segmentation map and the reference dress-up segmentation map). Based on these extracted image features and the acquired segmentation maps, the transferrer 310 may use ST-TPS transformation-based style transfer to learn the deformation from the reference dress-up in the reference image 112 to the target object in the target image 111, and may learn the style transfer from the reference dress-up to the target object.

According to embodiments of the present disclosure, the UV encoder 311 can obtain the view 313 of the target object including the reference dress-up in the reference image 112 in multiple view angles based on the target object including the reference dress-up in the reference image 112 as well as multi-view inputs for the target object that come from the view angle encoder 312.

For the view angle encoder 312, its objective is to take any view angle θ to rotate the 3D human body model and assign conditions to the image features. According to embodiments of the present disclosure, in order to rotate the 3D human body model, a virtual camera can be placed according to a given view angle, and a photograph P=cam(H, θ) of the 3D human body model can be taken, where P is the output image, H is the 3D human body model, and cam is a 3D to 2D projection. According to embodiments of the present disclosure, a one-hot code of the camera pose can also be used as an input to a convolutional neural network so as to learn the pose condition as o=G(μ, σ), where μ and σ are the mean and variance of the Gaussian-like pose distribution. The following Equation (1) can be used to assign conditions to image features:

$$C' = norm(C) * (1 + \sigma) + \mu \tag{1}$$

where C' is the conditional image feature, and norm is the normalization process that normalizes the original image feature C to a mean of 0 and a variance of 1.

For the UV encoder 311, according to embodiments of the present disclosure, a visibility encoder can be used to predict the visibility map M of a 3D human body model wearing clothes, which describes whether the pixels of the surface of the 3D human body are visible (denoted as "1") or invisible (denoted as "0") to the camera. In combination with the visibility map M, the following Equation (2) can be obtained:

$$V_o = U(P, C', l) \cdot M \tag{2}$$

where $V_o$ denotes the oth view of the 3D human body model. Here, the visibility map M can be used as a silhouette to crop the shape of the 3D human body to obtain a clear boundary.

In addition, according to embodiments of the present disclosure, the UV projector 314 can project the reference dress-up in the reference image 112 onto the 3D target object model 309 for the target object based on the view 313, which comes from the UV encoder 311, of the target object including the reference dress-up in the reference image 112 in multiple view angles as well as the 3D target object model 309 for the target object.

The UV projector 314 can take the initial 3D human body model H wearing clothes and the multiple views $o_i \in O$ (where i=1, 2, . . . , N) to project the texture map E. The process illustratively includes the following two parts: 1) estimation of an initial texture map $E_0$, and 2) refinement of the texture map. A small convolutional network can be used to process all views to produce the initial texture map E', i.e., a 2D projection of the 3D human body texture. At the same time, a 3D-2D displacement map $A=(u_i, v_i)$ can be predicted, where 0<i<X, 0<j<Y, which denotes the mapping relationship between 3D and 2D coordinates. A and E can be combined into a Laplacian mapping, and a graphical convolutional network can be used to learn the graphical representation for refinement. Mathematically, E=E'+R(A, E'). The refined texture map can be shaped back into a 3D human body model wearing clothes so as to obtain a color 3D human body model.

Figure 4:
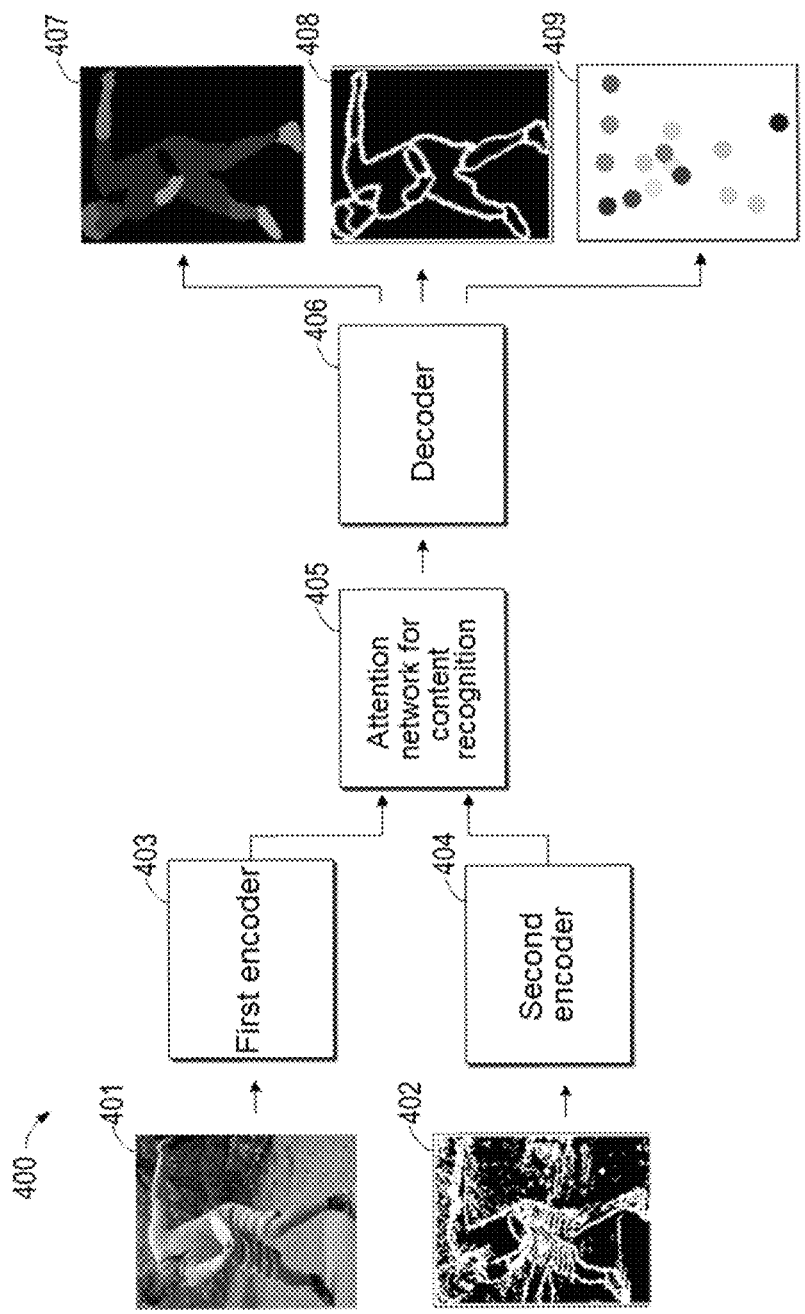
FIG. 4 illustrates a schematic diagram of a structure of a segmentation encoder according to embodiments of the present disclosure.

FIG. 4 illustrates a schematic diagram of the structure of a segmentation encoder 400 according to embodiments of the present disclosure. It should be noted that since the first segmentation encoder 305 and the second segmentation encoder 306 shown in FIG. 3 may have similar structures but have different weight parameters, the structures of the segmentation encoders are described uniformly herein using the segmentation encoder 400 as an illustrative example and are not described separately.

As illustrated by way of example in FIG. 4, the segmentation encoder 400 according to embodiments of the present disclosure includes a first encoder 403, a second encoder 404, an attention network 405 for content recognition, and a decoder 406.

According to embodiments of the present disclosure, an input image 401 may be filtered to obtain an edge image 402 of the input image 401. For example, the target image may be filtered to obtain a target edge image, and the reference image may be filtered to obtain a reference edge image. It should be noted that the present disclosure does not limit the filters used for filtering. The first encoder 403 may extract image features of the input image 401, and the second encoder 404 may extract edge features of the edge image 402. The first encoder 403 and the second encoder 404 may include one or more layers of convolutional neural networks. The attention network 405 for content recognition may perform learning (e.g., learning of edges of clothes) based on the image features of the input image 401 and the edge features of the edge image 402 from the first encoder 403 and the second encoder 404. It should be noted that the present disclosure is not limited to the attention network for content recognition, but may also be other networks with excellent performance. The decoder 406 may decode the output of the attention network 405 for content recognition to acquire a dress-up segmentation map 407 (e.g., a clothes segmentation map), an edge segmentation map 408 (e.g., a human body edge segmentation map), and key point information 409. The key point information 409 indicates a pose of the human body in the image and helps to perform the decoupling/segmentation process accurately even if the pose of the human body is distorted.

Still further, the segmentation encoder 400 may learn the segmentation map of the clothing items A and the 2D key points K. It should be noted that clothing segmentation is similar to human body segmentation, but differs in that clothing may overlap in different parts of the human body. The input image 401 is illustratively processed by a Canny detector to obtain an edge map E. An hourglass network may be used to extract and compress features so as to make the feature map compact. The attention network 405 for content recognition takes the edge features f(E) and the target object image features f(T) (or the reference dress-up image features f(R)) to learn the semantic relevance, in accordance with Equation (3) below:

$$W = \sum \left( S\left( \frac{Q_{f_E} K_{f_T}^T}{\sqrt{d}} \right) V_{f_T} \right) \tag{3}$$

where W is a weighted parameter describing the confidence score that measures the cross correlation between f(T) and f(E). The weighted residuals can be calculated and added to the original image features as f(T)=f(T)+W*f(T) for the purpose of updates. Residual blocks and bilinear upsampling can be used to gradually scale up the feature maps, so as to obtain a segmentation map, a boundary map, and an estimate of 2D human body key points as Seg, B, and K, respectively. It should be noted that the boundary map is only used for model training.

It should be noted that the specific models mentioned above are only examples and not limiting.

According to embodiments of the present disclosure, obtaining the target object segmentation map, the original dress-up segmentation map, and the target object key point information for the target image is implemented by decoupling the target image by the first segmentation encoder 305, wherein generating the first segmentation encoder 305 includes: extracting a target object image feature from the target image and extracting a target edge feature from the target edge image; generating a first loss function for the first segmentation encoder 305 based on the target object image feature and the target edge feature; and training the first segmentation encoder 305 using the first loss function; and adjusting a first set of parameters of the first segmentation encoder 305 by minimizing the first loss function.

According to embodiments of the present disclosure, obtaining the reference object segmentation map, the reference dress-up segmentation map, and the reference object key point information for the reference image is implemented by decoupling the reference image by the second segmentation encoder 306, wherein generating the second segmentation encoder 306 includes: extracting a reference dress-up image feature from the reference image; and extracting a reference edge feature from the reference edge image; generating a second loss function for the second segmentation encoder 306 based on the reference dress-up image feature and the reference edge feature; training the second segmentation encoder 306 using the second loss function; and adjusting a second set of parameters of the second segmentation encoder by minimizing the second loss function.

Figure 5:
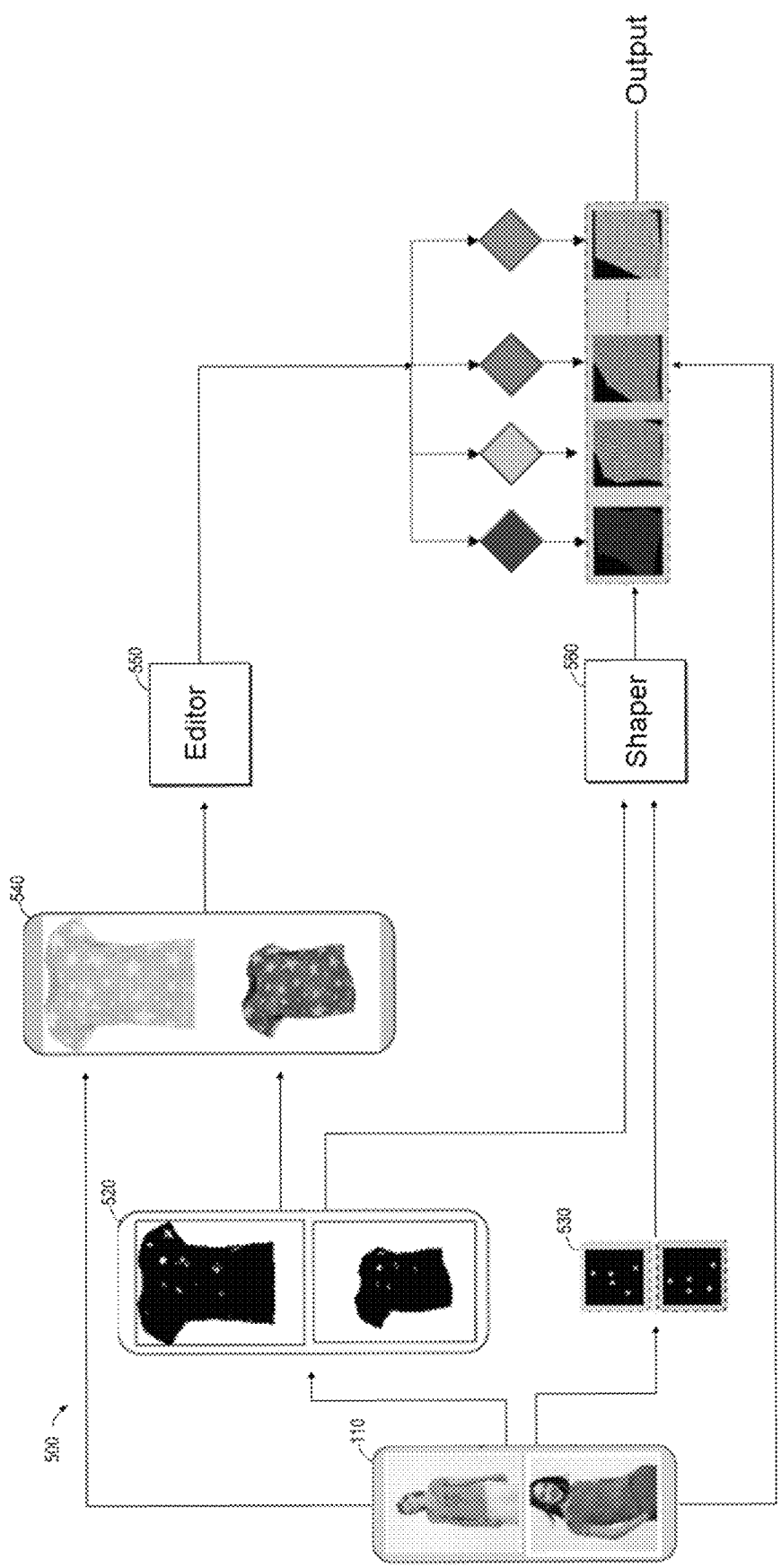
FIG. 5 illustrates a schematic diagram of a process of style transfer-based thin plate spline (ST-TPS) transformation according to embodiments of the present disclosure.

FIG. 5 illustrates a schematic diagram of a process 500 of style transfer-based thin plate spline (ST-TPS) transformation according to embodiments of the present disclosure. As illustrated in FIG. 5, the input 110 including the target image and the reference image may be processed by a segmentation encoder (such as the first segmentation encoder 305 and the second segmentation encoder 306) to obtain a segmentation map 520 and key point information 530. The segmentation map 520 may be multiplied by the input 110 to obtain a segmented map 540. An editor 550 can edit the segmented map 540, for example, by changing its color and pattern, and the like. A shaper 560 performs the shaping process according to embodiments of the present disclosure based on the segmentation map 520 and the key point information 530 so that the dress-up (e.g., clothes) accurately fits the object.

More specifically, using the 2D key points and the dress-up segmentation map obtained from the segmentation encoder according to embodiments of the present disclosure, the dress-up region can be located by first multiplying the segmentation map by the 2D key points, taking a T-shirt as an example, i.e., $K_{shirt}=Seg_{shirt} \times K$. It is also possible to use the segmentation map to crop the T-shirt region from the target image as $T_{shirt}=Seg_{shirt} \times T$, and in the case of cropping from the reference image, as $R_{shirt}=Seg_{shirt} \times R$. $T_{shirt}$ and $R_{shirt}$ may be processed to output multiple style codes st=$\mu_i$, $\sigma_i$, where i=1, 2, . . . , u is the number of style codes. Given the corresponding key points in the two images, one image can be shaped into the other with minimum distortion by using the TPS transformation $\mathcal{T}_{tps}$ as in Equation (4) below:

$$\min \int\int_{R^2} \left( \left(\frac{\partial^2 \mathcal{T}_{tps}}{\partial x^2}\right)^2 + 2\left(\frac{\partial^2 \mathcal{T}_{tps}}{\partial x \partial y}\right)^2 + \left(\frac{\partial^2 \mathcal{T}_{tps}}{\partial y^2}\right)^2 \right) dxdy \quad (4)$$
$$\text{s.t. } \mathcal{T}_{tps}(P_i^R) = P_i^T, i = 1, 2, \ldots, N$$

where $P_i^T$ is the key point of the target image, and $P_i^R$ is the key point of the reference image. Every N pairs (e.g., N=5) of key points generate one TPS transformation from the target image and the reference image. A total of K TPS transformations can be performed. The kth TPS transformation is obtained as the following Equation (5):

$$\mathcal{T}_k(p) = A_k \begin{bmatrix} p \\ 1 \end{bmatrix} + \sum_{i=1}^{N} w_{ki} U(\|P_{ki}^D - p\|_2) \quad (5)$$

where p=(x, y) is the pixel coordinate, $A_k \in \mathcal{R}^{2\times 3}$ and $w_{ki} \in \mathcal{R}^{2\times 1}$ are TPS coefficients obtained by solving Equation (5), where Equation (5) is the radial basis function, which denotes the influence of each key point on the pixel at p. The kth TPS transformation can be used to apply the style conversion as in the following Equation (6):

$$f(T)'_k = norm(\mathcal{T}_k) * \sigma(f(R)) + \mu(f(R)), \text{ where } k = 1, 2, \ldots K \quad (6)$$

where $f(T)'_k$ is the kth stylized feature map, norm(·) is the normalization, and u and o are the mean and variance operators.

According to embodiments of the present disclosure, a full-body 3D virtual try-on is realized, which makes the 3D virtual try-on process more in line with the real try-on demands of users and makes the 3D virtual try-on experience richer. The 3D virtual try-on according to embodiments of the present disclosure does not need to model the reference dress-up to be transferred in advance, thus avoiding the waste of computing resources and time costs and avoiding the limitation to the number of transferable clothing items. In addition, the 3D virtual try-on according to embodiments of the present disclosure can also avoid an odd shape or unnatural fit of the dress-up after the transfer, making the try-on experience more realistic.

Figure 6:
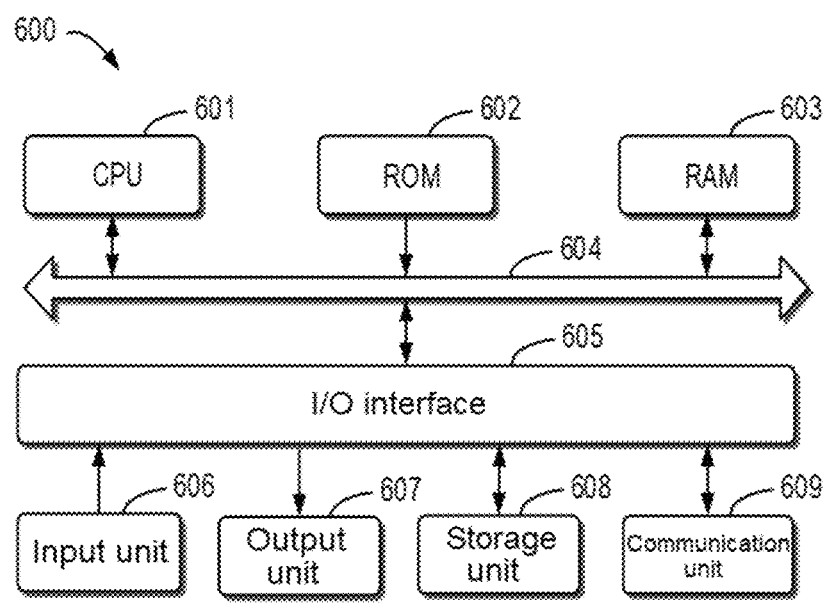
FIG. 6 illustrates a schematic block diagram of an example device that can be used to implement embodiments of the present disclosure.

FIG. 6 illustrates a schematic block diagram of an example device 600 that may be used to implement some embodiments of the present disclosure. As shown in FIG. 6, the device 600 includes central processing unit (CPU) 601 that may perform various appropriate actions and processing according to computer program instructions stored in a read-only memory (ROM) 602 or computer program instructions loaded from a storage unit 608 to a random access memory (RAM) 603. Various programs and data required for the operation of the device 600 may also be stored in the RAM 603. The CPU 601, the ROM 602, and the RAM 603 are connected to each other through a bus 604. An input/output (I/O) interface 605 is also connected to the bus 604.

A plurality of components in the device 600 are connected to the I/O interface 605, including: an input unit 606, such as a keyboard and a mouse; an output unit 607, such as various types of displays and speakers; a storage unit 608, such as a magnetic disk and an optical disc; and a communication unit 609, such as a network card, a modem, and a wireless communication transceiver. The communication unit 609 allows the device 600 to exchange information/data with other devices via a computer network such as the Internet and/or various telecommunication networks.

The various processes and processing described above, such as the method 200, may be performed by the CPU 601. For example, in some embodiments, the method 200 may be implemented as a computer software program that is tangibly included in a machine-readable medium such as the storage unit 608. In some embodiments, part of or all the computer program may be loaded and/or installed onto the device 600 via the ROM 602 and/or the communication unit 609. One or more actions of the method 200 described above may be performed when the computer program is loaded into the RAM 603 and executed by the CPU 601.

Illustrative embodiments of the present disclosure include a method, an apparatus, a system, and/or a computer program product. The computer program product may include a computer-readable storage medium on which computer-readable program instructions for performing various aspects of the present disclosure are loaded.

The computer-readable storage medium may be a tangible device that may retain and store instructions used by an instruction-executing device. For example, the computer-readable storage medium may be, but is not limited to, an electric storage device, a magnetic storage device, an optical storage device, an electromagnetic storage device, a semiconductor storage device, or any suitable combination of the foregoing. More specific examples (a non-exhaustive list) of the computer-readable storage medium include: a portable computer disk, a hard disk, a RAM, a ROM, an erasable programmable read-only memory (EPROM or flash memory), a static random access memory (SRAM), a portable compact disc read-only memory (CD-ROM), a digital versatile disc (DVD), a memory stick, a floppy disk, a mechanical encoding device, for example, a punch card or a raised structure in a groove with instructions stored thereon, and any suitable combination of the foregoing. The computer-readable storage medium used herein is not to be interpreted as transient signals per se, such as radio waves or other freely propagating electromagnetic waves, electromagnetic waves propagating through waveguides or other transmission media (e.g., light pulses through fiber-optic cables), or electrical signals transmitted through electrical wires.

The computer-readable program instructions described herein may be downloaded from a computer-readable storage medium to various computing/processing devices, or downloaded to an external computer or external storage device via a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from a network and forwards the computer-readable program instructions for storage in a computer-readable storage medium in each computing/processing device.

The computer program instructions for executing the operation of the present disclosure may be assembly instructions, instruction set architecture (ISA) instructions, machine instructions, machine-dependent instructions, microcode, firmware instructions, status setting data, or source code or object code written in any combination of one or a plurality of programming languages, the programming languages including object-oriented programming languages such as Smalltalk and C++, and conventional procedural programming languages such as the C language or similar programming languages. The computer-readable program instructions may be executed entirely on a user computer, partly on a user computer, as a stand-alone software package, partly on a user computer and partly on a remote computer, or entirely on a remote computer or a server. In a case where a remote computer is involved, the remote computer can be connected to a user computer through any kind of networks, including a local area network (LAN) or a wide area network (WAN), or can be connected to an external computer (for example, connected through the Internet using an Internet service provider). In some embodiments, an electronic circuit, such as a programmable logic circuit, a field programmable gate array (FPGA), or a programmable logic array (PLA), is customized by utilizing status information of the computer-readable program instructions. The electronic circuit may execute the computer-readable program instructions so as to implement various aspects of the present disclosure.

Various aspects of the present disclosure are described herein with reference to flow charts and/or block diagrams of the method, the apparatus (system), and the computer program product according to embodiments of the present disclosure. It should be understood that each block of the flow charts and/or the block diagrams and combinations of blocks in the flow charts and/or the block diagrams may be implemented by computer-readable program instructions.

These computer-readable program instructions may be provided to a processing unit of a general-purpose computer, a special-purpose computer, or a further programmable data processing apparatus, thereby producing a machine, so that these instructions, when executed by the processing unit of the computer or the further programmable data processing apparatus, produce means for implementing functions/actions specified in one or a plurality of blocks in the flow charts and/or block diagrams. These computer-readable program instructions may also be stored in a computer-readable storage medium, and these instructions cause a computer, a programmable data processing apparatus, and/or other devices to operate in a specific manner; and thus the computer-readable medium having instructions stored includes an article of manufacture that includes instructions that implement various aspects of the functions/actions specified in one or more blocks in the flow charts and/or block diagrams.

The computer-readable program instructions may also be loaded to a computer, a further programmable data processing apparatus, or a further device, so that a series of operating steps may be performed on the computer, the further programmable data processing apparatus, or the further device to produce a computer-implemented process, so that the instructions executed on the computer, the further programmable data processing apparatus, or the further device may implement the functions/actions specified in one or a plurality of blocks in the flow charts and/or block diagrams.

The flow charts and block diagrams in the drawings illustrate the architectures, functions, and operations of possible implementations of the systems, methods, and computer program products according to various embodiments of the present disclosure. In this regard, each block in the flow charts or block diagrams may represent a module, a program segment, or part of an instruction, the module, program segment, or part of an instruction including one or a plurality of executable instructions for implementing specified logical functions. In some alternative implementations, functions marked in the blocks may also occur in an order different from that marked in the accompanying drawings. For example, two successive blocks may actually be executed in parallel substantially, and sometimes they may also be executed in a reverse order, which depends on involved functions. It should be further noted that each block in the block diagrams and/or flow charts as well as a combination of blocks in the block diagrams and/or flow charts may be implemented using a dedicated hardware-based system that executes specified functions or actions, or using a combination of special hardware and computer instructions.

Various embodiments of the present disclosure have been described above. The above description is illustrative, rather than exhaustive, and is not limited to the disclosed various embodiments. Numerous modifications and alterations will be apparent to persons of ordinary skill in the art without departing from the scope and spirit of the illustrated embodiments. The selection of terms used herein is intended to best explain the principles and practical applications of the various embodiments and their associated technical improvements, so as to enable persons of ordinary skill in the art to understand the embodiments disclosed herein.

What is claimed is:

1. A method for image processing, comprising:
   obtaining a target object segmentation map for a target image and a reference dress-up segmentation map for a reference image, wherein the target image presents a target object, and the reference image presents reference dress-up;
   extracting a target image feature of the target image and a reference image feature of the reference image by means of image encoding of the target image and the reference image; and
   transferring the reference dress-up in the reference image to the target object based on the target object segmentation map, the reference dress-up segmentation map, the target image feature, and the reference image feature;
   wherein obtaining the target object segmentation map for the target image comprises:
   obtaining a target edge image by filtering the target image; and
   obtaining the target object segmentation map based on the target image and the target edge image; and
   wherein obtaining the reference dress-up segmentation map for the reference image comprises:
   obtaining a reference edge image by filtering the reference image; and
   obtaining the reference dress-up segmentation map based on the reference image and the reference edge image.

2. The method according to claim 1, wherein the target image presents original dress-up of the target object, and the reference image presents a reference object including the reference dress-up, the method further comprising:
   obtaining an original dress-up segmentation map and target object key point information for the target image based on the target image and the target edge image; and
   obtaining a reference object segmentation map and reference object key point information for the reference image based on the reference image and the reference edge image.

3. The method according to claim 2, wherein transferring the reference dress-up in the reference image to the target object comprises:
   transferring the reference dress-up in the reference image to the target object further based on the original dress-up segmentation map, the target object key point information, the reference object segmentation map, and the reference object key point information,
   wherein the target object key point information indicates a pose of the target object in the target image, and the reference object key point information indicates a pose of the reference object in the reference image.

4. The method according to claim 3, wherein transferring the reference dress-up in the reference image to the target object comprises:
   transferring all the reference dress-up in the reference image to the target object;
   shaping the transferred reference dress-up, so that the transferred reference dress-up fits the target object; and
   transferring environmental conditions in the reference image to the target object.

5. The method according to claim 4, wherein shaping the transferred reference dress-up comprises:
   determining a distribution of key points of the target object in the target image and a distribution of key points of the reference object in the reference image based on the target object key point information and the reference object key point information; and
   deforming the reference dress-up based on a mapping from key points of the reference object to key points of the target object.

6. The method according to claim 4, further comprising:
   determining editing of the target object;
   determining editing of at least some of the transferred reference dress-up; and
   determining editing of at least some of the transferred environmental conditions.

7. The method according to claim 2, wherein obtaining the target object segmentation map, the original dress-up segmentation map, and the target object key point information for the target image is implemented by decoupling the target image by a first segmentation encoder, generating the first segmentation encoder comprising:
   extracting a target object image feature from the target image and extracting a target edge feature from the target edge image;
   generating a first loss function for the first segmentation encoder based on the target object image feature and the target edge feature;
   training the first segmentation encoder using the first loss function; and
   adjusting a first set of parameters of the first segmentation encoder by minimizing the first loss function.

8. The method according to claim 2, wherein obtaining the reference object segmentation map, the reference dress-up segmentation map, and the reference object key point information for the reference image is implemented by decoupling the reference image by a second segmentation encoder, generating the second segmentation encoder comprising:
   extracting a reference dress-up image feature from the reference image and extracting a reference edge feature from the reference edge image;

generating a second loss function for the second segmentation encoder based on the reference dress-up image feature and the reference edge feature;
training the second segmentation encoder using the second loss function; and
adjusting a second set of parameters of the second segmentation encoder by minimizing the second loss function.

9. The method according to claim 1, wherein the target image is a red, green, and blue (RGB) image presenting the target object, the method further comprising:
extracting two-dimensional (2D) image features of the RGB image by means of image encoding of the RGB image; and
establishing a three-dimensional (3D) target object model for the target object by means of 3D object modeling of the target object based on the 2D image features of the RGB image and an object template,
wherein the object template comprises parameters of a shape and a pose of the 3D target object model.

10. The method according to claim 9, further comprising:
obtaining a view of the target object comprising the reference dress-up in the reference image in multiple view angles based on the target object comprising the reference dress-up in the reference image as well as multi-view inputs for the target object; and
projecting the reference dress-up in the reference image onto the 3D target object model for the target object based on the view of the target object comprising the reference dress-up in the reference image in the multiple view angles as well as the 3D target object model for the target object.

11. A device for image processing, comprising:
at least one processor; and
memory coupled to the at least one processor and storing instructions, wherein the instructions, when executed by the at least one processor, cause the device to execute the following actions:
obtaining a target object segmentation map for a target image and a reference dress-up segmentation map for a reference image, wherein the target image presents a target object, and the reference image presents reference dress-up;
extracting a target image feature of the target image and a reference image feature of the reference image by means of image encoding of the target image and the reference image; and
transferring the reference dress-up in the reference image to the target object based on the target object segmentation map, the reference dress-up segmentation map, the target image feature, and the reference image feature;
wherein obtaining the target object segmentation map for the target image comprises:
obtaining a target edge image by filtering the target image; and
obtaining the target object segmentation map based on the target image and the target edge image; and
wherein obtaining the reference dress-up segmentation map for the reference image comprises:
obtaining a reference edge image by filtering the reference image; and
obtaining the reference dress-up segmentation map based on the reference image and the reference edge image.

12. The device according to claim 11, wherein the target image presents original dress-up of the target object, and the reference image presents a reference object including the reference dress-up, the actions further comprising:
obtaining an original dress-up segmentation map and target object key point information for the target image based on the target image and the target edge image; and
obtaining a reference object segmentation map and reference object key point information for the reference image based on the reference image and the reference edge image.

13. The device according to claim 12, wherein transferring the reference dress-up in the reference image to the target object comprises:
transferring the reference dress-up in the reference image to the target object further based on the original dress-up segmentation map, the target object key point information, the reference object segmentation map, and the reference object key point information,
wherein the target object key point information indicates a pose of the target object in the target image, and the reference object key point information indicates a pose of the reference object in the reference image.

14. The device according to claim 13, wherein transferring the reference dress-up in the reference image to the target object comprises:
transferring all the reference dress-up in the reference image to the target object;
shaping the transferred reference dress-up, so that the transferred reference dress-up fits the target object; and
transferring environmental conditions in the reference image to the target object.

15. The device according to claim 14, wherein shaping the transferred reference dress-up comprises:
determining a distribution of key points of the target object in the target image and a distribution of key points of the reference object in the reference image based on the target object key point information and the reference object key point information; and
deforming the reference dress-up based on a mapping from key points of the reference object to key points of the target object.

16. The device according to claim 12, wherein obtaining the target object segmentation map, the original dress-up segmentation map, and the target object key point information for the target image is implemented by decoupling the target image by a first segmentation encoder, generating the first segmentation encoder comprising:
extracting a target object image feature from the target image and extracting a target edge feature from the target edge image;
generating a first loss function for the first segmentation encoder based on the target object image feature and the target edge feature;
training the first segmentation encoder using the first loss function; and
adjusting a first set of parameters of the first segmentation encoder by minimizing the first loss function.

17. The device according to claim 12, wherein obtaining the reference object segmentation map, the reference dress-up segmentation map, and the reference object key point information for the reference image is implemented by decoupling the reference image by a second segmentation encoder, generating the second segmentation encoder comprising:
extracting a reference dress-up image feature from the reference image and extracting a reference edge feature from the reference edge image;

generating a second loss function for the second segmentation encoder based on the reference dress-up image feature and the reference edge feature;

training the second segmentation encoder using the second loss function; and adjusting a second set of parameters of the second segmentation encoder by minimizing the second loss function.

18. The device according to claim 11, wherein the target image is a red, green, and blue (RGB) image presenting the target object, the actions further comprising:

extracting two-dimensional (2D) image features of the RGB image by means of image encoding of the RGB image; and establishing a three-dimensional (3D) target object model for the target object by means of 3D object modeling of the target object based on the 2D image features of the RGB image and an object template, wherein the object template comprises parameters of a shape and a pose of the 3D target object model for the target object.

19. The device according to claim 18, wherein the actions further comprise:

obtaining a view of the target object comprising the reference dress-up in the reference image in multiple view angles based on the target object comprising the reference dress-up in the reference image as well as multi-view inputs for the target object; and projecting the reference dress-up in the reference image onto the 3D target object model for the target object based on the view of the target object comprising the reference dress-up in the reference image in the multiple view angles as well as the 3D target object model for the target object.

20. A computer program product that is tangibly stored on a non-transitory computer-readable storage medium and comprises computer-executable instructions, wherein the computer-executable instructions, when executed by a computer, cause the computer to perform the following operations:

obtaining a target object segmentation map for a target image and a reference dress-up segmentation map for a reference image, wherein the target image presents a target object, and the reference image presents reference dress-up;

extracting a target image feature of the target image and a reference image feature of the reference image by means of image encoding of the target image and the reference image; and transferring the reference dress-up in the reference image to the target object based on the target object segmentation map, the reference dress-up segmentation map, the target image feature, and the reference image feature;

wherein obtaining the target object segmentation map for the target image comprises:

obtaining a target edge image by filtering the target image; and obtaining the target object segmentation map based on the target image and the target edge image; and wherein obtaining the reference dress-up segmentation map for the reference image comprises:

obtaining a reference edge image by filtering the reference image; and obtaining the reference dress-up segmentation map based on the reference image and the reference edge image.

* * * * *